US012353872B2

United States Patent
Hursey et al.

(10) Patent No.: US 12,353,872 B2
(45) Date of Patent: Jul. 8, 2025

(54) CONSIDERING DIFFERENCES OF SOFTWARE IMAGES DURING SOFTWARE IMAGE DISTRIBUTION USING PATCHES

(71) Applicant: International Business Machines Corporation, Armonk, NY (US)

(72) Inventors: Joshua James Hursey, La Crosse, WI (US); Thomas Gooding, Rochester, MN (US); William Morrison, Poughkeepsie, NY (US); Geoff Paulsen, Plano, TX (US); David Solt, Frisco, TX (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 18/139,234

(22) Filed: Apr. 25, 2023

(65) Prior Publication Data

US 2024/0362014 A1  Oct. 31, 2024

(51) Int. Cl.
*G06F 8/658* (2018.01)
*G06F 8/61* (2018.01)
*G06F 8/71* (2018.01)

(52) U.S. Cl.
CPC ............... *G06F 8/658* (2018.02); *G06F 8/63* (2013.01); *G06F 8/71* (2013.01)

(58) Field of Classification Search
CPC ............... G06F 8/658; G06F 8/63; G06F 8/71
See application file for complete search history.

(56) References Cited

U.S. PATENT DOCUMENTS

| 7,461,374 | B1 * | 12/2008 | Balint ..................... G06F 8/658 |
| | | | 717/135 |
| 7,805,719 | B2 | 9/2010 | O'Neill |
| 8,543,543 | B2 | 9/2013 | Marcelais et al. |
| 9,268,059 | B2 | 2/2016 | Ortiz et al. |
| 9,286,059 | B2 | 3/2016 | Hatakeyama |
| 11,042,366 | B2 * | 6/2021 | Gibbs ....................... G06F 8/65 |
| 11,379,207 | B2 * | 7/2022 | Scheinkman ....... G06F 9/45558 |
| 11,656,864 | B2 * | 5/2023 | Chen ........................ G06F 8/63 |
| | | | 717/168 |

(Continued)

OTHER PUBLICATIONS

Wikipedia, "Delta Update," Wikipedia, 2022, 1 page, retrieved from https://en.wikipedia.org/wiki/Delta_update on Oct. 3, 2022.

(Continued)

*Primary Examiner* — Marina Lee
(74) *Attorney, Agent, or Firm* — Zilka-Kotab, P.C.

(57) ABSTRACT

A computer-implemented method, according to one embodiment, includes receiving a first image, having a first image tag, to store in a predetermined image storage service, and determining whether the first image tag matches any image tags of images stored in the image storage service. In response to a determination that the first image tag matches a second image tag associated with a second image stored in the image storage service, a predetermined process is performed. The predetermined process includes determining whether the first image is identical to the second image, and in response to a determination that the first image is not identical to the second image, executing actions. The actions include generating a patch of differences between the first image and the second image to thereafter use for fulfilling requests for data.

20 Claims, 8 Drawing Sheets

(56) References Cited

U.S. PATENT DOCUMENTS

| | | | | |
|---|---|---|---|---|
| 11,803,303 | B1* | 10/2023 | Huo | G06F 8/65 |
| 11,836,484 | B1* | 12/2023 | Hensley | G06F 8/65 |
| 12,124,414 | B2* | 10/2024 | Scrivano | G06F 16/178 |
| 2019/0146772 | A1* | 5/2019 | Griffin | G06F 11/3698 717/121 |
| 2020/0057625 | A1* | 2/2020 | Livne | G06F 8/65 |
| 2021/0072977 | A1* | 3/2021 | Giri | G06F 8/63 |
| 2021/0075846 | A1* | 3/2021 | Demasi | H04L 47/82 |
| 2022/0100859 | A1* | 3/2022 | Chang | G06F 8/658 |
| 2024/0329960 | A1* | 10/2024 | Waterman | G06F 8/71 |

OTHER PUBLICATIONS

Balena Io, "Delta updates," Balena, 2020, 2 pages, retrieved from https://docs.balena.io/learn/deploy/delta/ on Oct. 6, 2022.

Percival, C., "bsdiff—generate a patch between two binary files," Ubuntu Manuals, 2019, 2 pages, retrieved from https://manpages.ubuntu.com/manpages/bionic/man1/bsdiff.1.html on Oct. 3, 2022.

Chromium, "Software Updates: Courgette," The Chromium Projects, 2022, 4 pages, retrieved from https://www.chromium.org/developers/design-documents/software-updates-courgette/ on Oct. 3, 2022.

Pocket Soft, "RTPatch Technology Overview," 2022, 3 pages, retrieved from https://pocketsoft.com/rtpatch_binary_diff.html on Oct. 3, 2022.

Pycom, "Differential OTA Update," pycom, 2022, 2 pages, retrieved from https://docs.pycom.io/updatefirmware/diff_ota/ on Oct. 3, 2022.

Apple Developer Documentation, "Doing Advanced Optimization to Further Reduce Your App's Size," Apple, Xcode, 2015, 3pages, retrieved from https://developer.apple.com/documentation/xcode/doing-advanced-optimization-to-further-reduce-your-app-s-size on Oct. 6, 2022.

Larsson, A., "Putting container updates on a diet," Blogs Gnome, May 13, 2020, 7 pages, retrieved from https://blogs.gnome.org/alexl/2020/05/13/putting-container-updates-on-a-diet/ on Oct. 6, 2022.

GitHub, "Opencontainers," GitHub, 6 pages, Nov. 17, 2021, 6 pages, retrieved from https://github.com/ppencontainers/image-spec on Oct. 6, 2022.

Dockerdocs, "About Storage Drivers," Docker Inc., May 18, 2022, 14 pages, retrieved from https://docs.docker.com/storage/storagedriver/#images-and-layers.

GitHub, "IPS: Image Packaging System package manager," GitHub, Jun. 2, 2015, 2 pages, retrieved from https://github.com/openindiana/pkg5 on Oct. 6, 2022.

GitHub, "Content-Addressable Data Synchronization Tool," GitHub, Nov. 24, 2017, 5 pages, retrieved from https://github.com/systemd/casync on Oct. 9, 2022.

Moinakg's Ramblings, "High Performance Content Defined Chunking," The Pseudo Random Bit Bucket, Jun. 22, 2013, 11 pages, retrieved from https://moinakg.wordpress.com/2013/06/22/high-performance-content-defined-chunking/ on Oct. 9, 2022.

GitHub, "Nydus: Dragonfly Container Image Service," GitHub, May 18, 2022, 7 pages, retrieved from https://github.com/dragonflyoss/image-service on Oct. 9, 2022.

GitHub, "GoogleContainerTools-container-diff," GitHub, Aug. 24, 2017, 12 pages, retrieved from https://github.com/GoogleContainerTools/container-diff on Oct. 9, 2022.

Eggert et al., "diff(1)—Linux manual page," man7.org, Linux/UNIX system programming training, Aug. 2021, 16 pages, retrieved from https://man7.org/linux/man-pages/man1/diff.1.html#Author on Oct. 10, 2022.

GIT, "git-diff—Show changes between commits, commit and working tree, etc," git -fast-version-control, 2018, 29 pages, retrieved from https://git-scm.com/docs/git-diff on Oct. 10, 2022.

Percival, C., "bspatch—apply a patch built with bsdiff(1)," Ubuntu Manuals, 2019, 2 pages, retrieved from https://manpages.ubuntu.com/manpages/bionic/man 1/bspatch.1.html.

Git, "git-apply—Apply a patch to files and/or to the index," git -fast-version-control, 2023, 11 pages, retrieved from https://git-scm.com/docs/git-apply.

GitHub, "moul-docker diff," GitHub, Feb. 5, 2016, 5 pages, retrieved from https://github.com/moul/docker-diff on Oct. 10, 2023.

Wikipedia, "Delta Update," last edited on Mar. 27, 2023, 3 pages, retrieved from https://en.wikipedia.org/wiki/Delta_update.

Percival, "Bsdiff—Generate a Patch Between Two Binary Files," Ubuntu Manuals, Apr. 3, 2020, 2 pages, retrieved from https://manpages.ubuntu.com/manpages/bionic/man1/bsdiff.1.html#name.

The Chromium Projects, "Software Updates: Courgette," Sep. 13, 2022, 4 pages, retrieved from https://www.chromium.org/developers/design-documents/software-updates-courgette/.

Pocket Soft, "RTPatch Technology Overview," 2023, 3 pages, retrieved from https://pocketsoft.com/rtpatch_binary_diff.html.

Pycom—Go Invent, "Differential OTA Update," 2023, 3 pages, retrieved from https://docs.pycom.io/updatefirmware/diff_ota/.

Apple Developer Documentation, "Doing Advanced Optimization to Further Reduce Your App's Size," 2015, 4 pages, retrieved from https://developer.apple.com/documentation/xcode/doing-advanced-optimization-to-further-reduce-your-app-s-size.

Balena Documentation, "Delta Updates," Apr. 20, 2020, 2 pages, retrieved from https://docs.balena.io/learn/deploy/delta/.

Alexander Larsson, "Putting Container Updates on a Diet," Blogs Gnome.org, May 13, 2020, 6 pages, retrieved from https://blogs.gnome.org/alexl/2020/05/13/putting-container-updates-on-a-diet/.

DockerDocs, "About Storage Drivers," Docker Inc., May 18, 2022, 12 pages, retrieved from https://docs.docker.com/storage/storagedriver/#images-and-layers.

Akihiro Suda, "FILEgrain: Transport-Agnostic, Fine-Grained Content-Addressable Container Image Layout," Open Source Summit North America, Sep. 11, 2017, 48 pages, retrieved from https://www.slideshare.net/AkihiroSuda/filegrain-transportagnostic-finegrained-contentaddressable-container-image-layout?from_action=save.

Moinakg's Ramblings, "High Performance Content Defined Chunking," Jun. 22, 2013, 7 pages, retrieved from https://moinakg.wordpress.com/2013/06/22/high-performance-content-defined-chunking/.

Git—Everything is Local, "git-diff—Show Changes Between Commits, Commit and Working Tree, etc," Version 2.40.0, Mar. 12, 2023, 32 pages, retrieved from https://git-scm.com/docs/git-diff.

Paul Eggert et al., "diff—Compare Files Line By Line," diff(1)—Linux manual page, Feb. 2022, 6 pages, retrieved from https://man7.org/linux/man-pages/man1/diff.1.html.

* cited by examiner

CONSIDERING DIFFERENCES OF SOFTWARE IMAGES DURING SOFTWARE IMAGE DISTRIBUTION USING PATCHES

BACKGROUND

The present invention relates to software image distribution, and more specifically, this invention relates to using patches to considering differences of software images during software image distribution.

Software deployment throughout a distributed system, e.g., such as in a network of client devices, often begins with an initial software package being distributed by an administrator device. Thereafter, software updates, e.g., such as version updates of the software package, are typically ongoingly distributed to client devices in order to upkeep software in the software package, e.g., to update configuration settings, to update firewall settings, to update malware precautionary settings, to incorporate new user features, etc.

Software images are used for updating software in some environments. A "software image" is a logical data set that comprises all of the software that can be used to establish file system(s) on a machine. Software images are used when formatting a new bare metal machine, creating a new virtual machine, and establishing the file system for a software container. In the case of containers, the software image is often broken down into one or more layers that, when combined. e.g., overlaid, create the final view of the file system.

SUMMARY

A computer-implemented method, according to one embodiment, includes receiving a first image, having a first image tag, to store in a predetermined image storage service, and determining whether the first image tag matches any image tags of images stored in the image storage service. In response to a determination that the first image tag matches a second image tag associated with a second image stored in the image storage service, a predetermined process is performed. The predetermined process includes determining whether the first image is identical to the second image, and in response to a determination that the first image is not identical to the second image, executing actions. The actions include generating a patch of differences between the first image and the second image to thereafter use for fulfilling requests for data.

A computer-implemented method, according to another embodiment, includes receiving a request for a first image, having a first image tag, from a client device, and determining whether the client device possesses any version of the first image. In response to a determination that the client device possesses a first version of the first image, a first portion of the first image for updating the first version of the first image is sent to a current version of the first image possessed by an image storage service.

A computer program product, according to another embodiment, includes a computer readable storage medium having program instructions embodied therewith. The program instructions are readable and/or executable by a computer to cause the computer to receive a first image, having a first image tag, to store in a predetermined image storage service and determine whether the first image tag matches any image tags of images stored in the image storage service. In response to a determination that the first image tag matches a second image tag associated with a second image stored in the image storage service, a predetermined process is performed. The predetermined process includes determining whether the first image is identical to the second image, and in response to a determination that the first image is not identical to the second image, executing actions. The actions include generating a patch of differences between the first image and the second image to thereafter use for fulfilling requests for data.

Other aspects and embodiments of the present invention will become apparent from the following detailed description, which, when taken in conjunction with the drawings, illustrate by way of example the principles of the invention.

DETAILED DESCRIPTION

Figure 1:
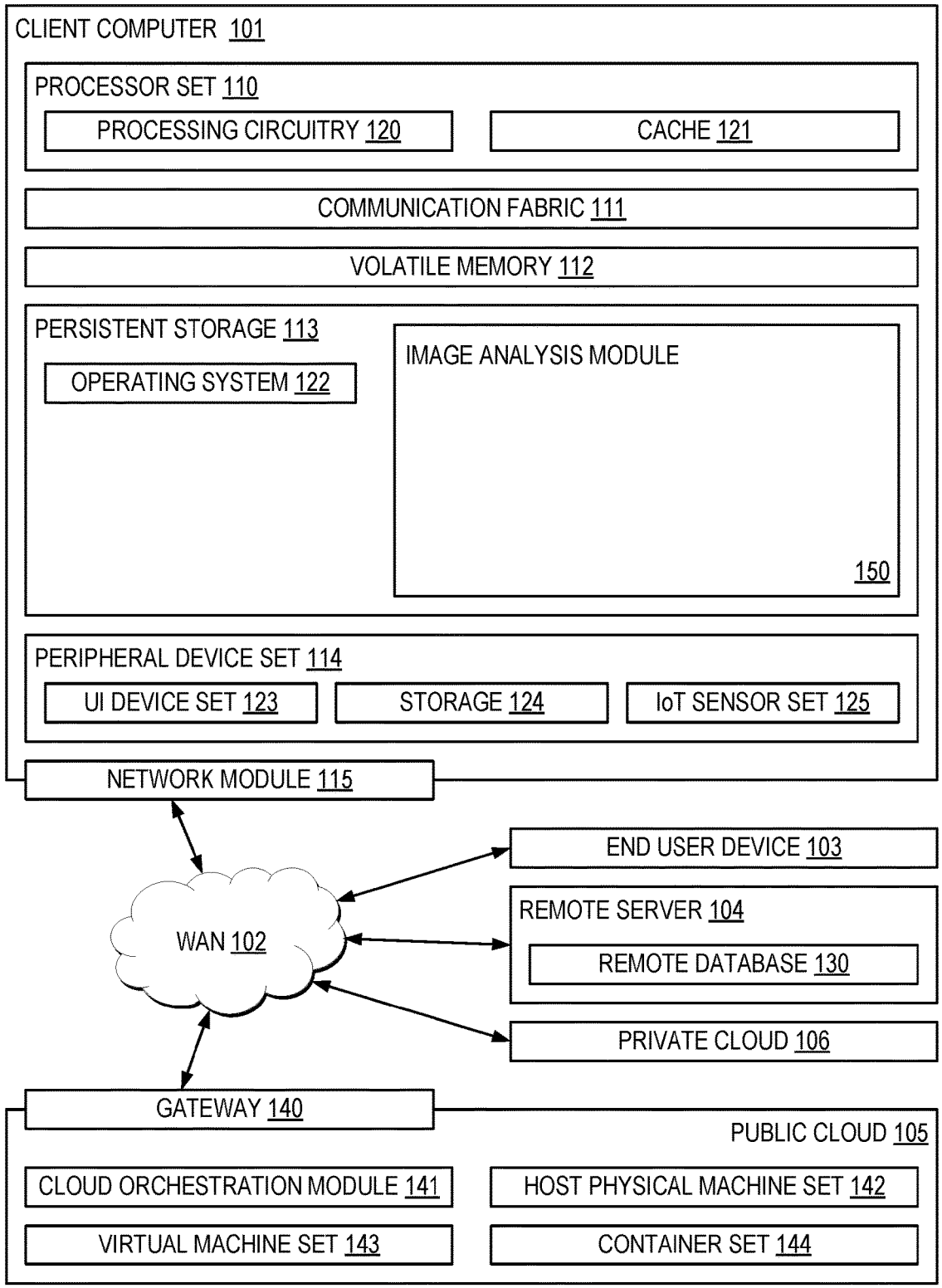
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for considering differences of software images during software image distribution using patches.

In one general embodiment, a computer-implemented method includes receiving a first image, having a first image tag, to store in a predetermined image storage service, and determining whether the first image tag matches any image tags of images stored in the image storage service. In response to a determination that the first image tag matches a second image tag associated with a second image stored in the image storage service, a predetermined process is performed. The predetermined process includes determining whether the first image is identical to the second image, and in response to a determination that the first image is not identical to the second image, executing actions. The actions include generating a patch of differences between the first image and the second image to thereafter use for fulfilling requests for data.

In another general embodiment, a computer-implemented method includes receiving a request for a first image, having a first image tag, from a client device, and determining whether the client device possesses any version of the first image. In response to a determination that the client device possesses a first version of the first image, a first portion of the first image for updating the first version of the first image is sent to a current version of the first image possessed by an image storage service.

In another general embodiment, a computer program product includes a computer readable storage medium having program instructions embodied therewith. The program instructions are readable and/or executable by a computer to cause the computer to receive a first image, having a first image tag, to store in a predetermined image storage service and determine whether the first image tag matches any image tags of images stored in the image storage service. In response to a determination that the first image tag matches a second image tag associated with a second image stored in the image storage service, a predetermined process is performed. The predetermined process includes determining whether the first image is identical to the second image, and in response to a determination that the first image is not identical to the second image, executing actions. The actions include generating a patch of differences between the first image and the second image to thereafter use for fulfilling requests for data.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as image analysis module of block 150 for considering differences of software images during software image distribution using patches. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 2:
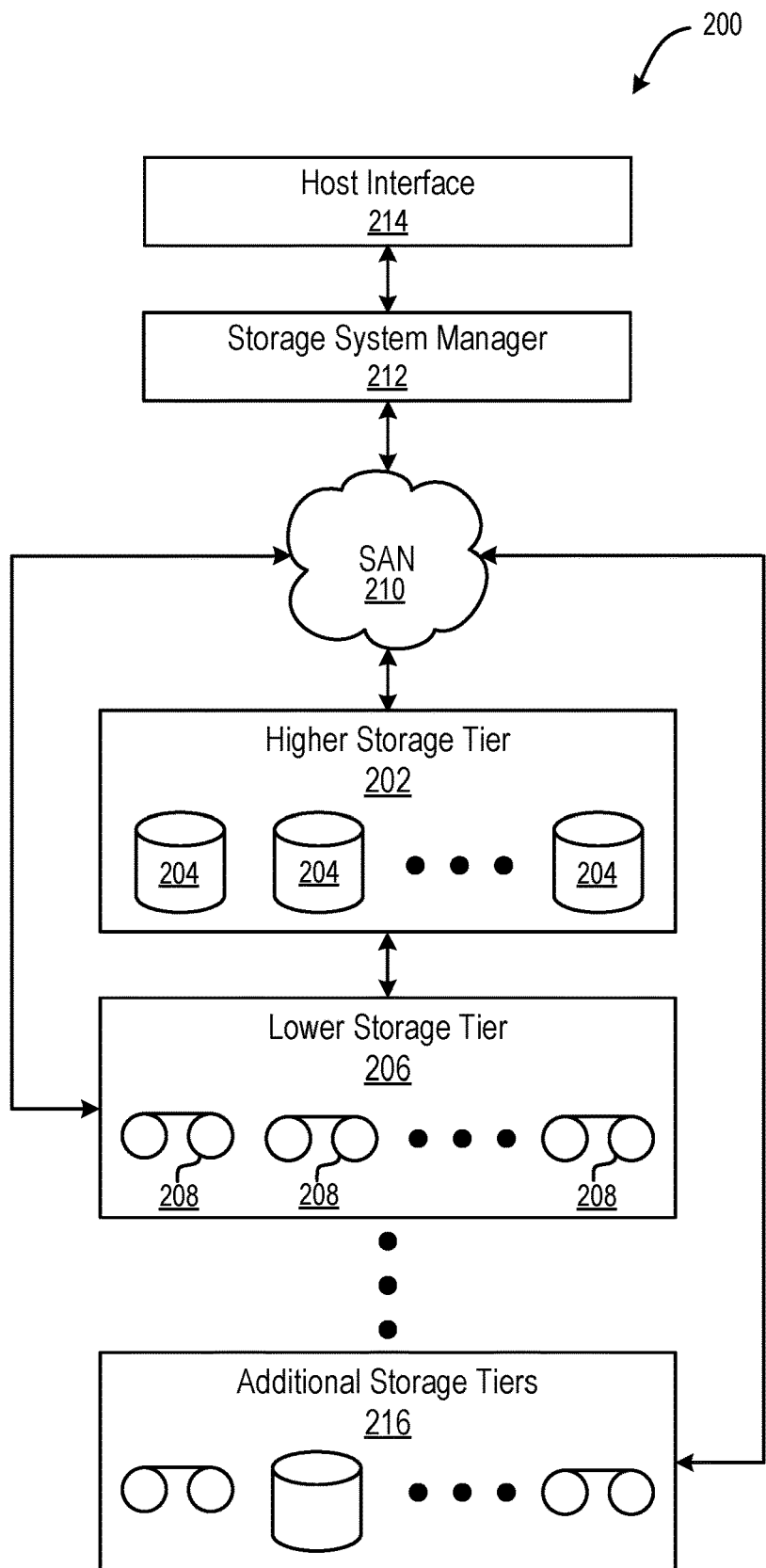
FIG. 2 is a diagram of a tiered data storage system, in accordance with one embodiment of the present invention.

Now referring to FIG. 2, a storage system 200 is shown according to one embodiment. Note that some of the elements shown in FIG. 2 may be implemented as hardware and/or software, according to various embodiments. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skilled in the art, upon reading the present descriptions, may devise many other combinations of storage media types to implement into different storage schemes, according to the embodiments presented herein.

According to some embodiments, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

Of course, this logic may be implemented as a method on any device and/or system or as a computer program product, according to various embodiments.

As mentioned elsewhere above, software deployment throughout a distributed system, e.g., such as in a network of client devices, often begins with an initial software package being distributed by an administrator device. Thereafter, software updates, e.g., such as version updates of the software package, are typically ongoingly distributed to client devices in order to upkeep software in the software package, e.g., to update configuration settings, to update firewall settings, to update malware precautionary settings, to incorporate new user features, etc.

Software images are used for updating software in some environments. A "software image" is a logical data set that comprises all of the software that can be used to establish file system(s) on a machine. Software images are used when formatting a new bare metal machine, creating a new virtual machine, and establishing the file system for a software container. In the case of containers, the software image is often broken down into one or more layers that, when combined, e.g., overlaid, create the final view of the file system. These software images can be considerable in size, e.g., often hundreds of megabytes (MB) to a plurality of GB. Accordingly, the transfer of the software image to multiple machines can become a bottleneck to starting the bare metal machine, virtual machine, and/or container.

Software images, e.g., also referred elsewhere herein as "images", can be cached on multiple machines to distribute the load caused by pulling the image. With respect to containers, layers of the image are often cached on the machines that have previously run the image. The images often need to be updated to account for software updates, add and/or remove dependencies, and application of security patches. When this image update occurs, the entire new image (or in the case of containers each updated layer of the image) is distributed to all of the requesting machines, thereby incurring a significant load on the network and time delay to update machines. This performance loss is proportional to the image size and is directly visible to the customer as a delay in starting or upgrading a service. Accordingly, there is a longstanding need within the field of software distribution environments for enabling techniques that enable relatively rapid deployment of software images to remote machines while mitigating the performance losses and delays incurred in the conventional techniques described above.

As indicated elsewhere above, in some respects, an image is a generic blob of data representing either all or part of the final image. Some conventional deduplication experimentations consider breaking down an image format into smaller blobs to allow for better deduplication of layer content storage and transmission. However, the breakdown of an image into blobs of data is inefficient with respect to storage space and processing in that where two blobs differ only slightly, e.g., a single character change is made to a configuration file, two very similar blobs are created and stored. An extent of the relative inefficiency in this storage practice is compounded by the fact that, across multiple layers of an image, upon a container being updated, one or more layers in that image may also be updated. For example, in the case of a security update, the update may be applied to a lower layer and cause all of the upper layers to be regenerated.

In sharp contrast to the deficiencies of the conventional techniques described above, various embodiments and approaches described herein define a technique by which a patch representing a binary difference between a prior and current image, the same image with two different tags/labels, and/or two different unrelated images is generated. In other words, in some approaches described herein, when an image is created or updated a binary patch is generated between each of the binary components, e.g., "blob", parts of the new software image and other software images in the image storage service. Only the patch and one of these two blobs is stored since the other blob can be recreated from these components. This saves on storage space within the image storage service. The patch is thereafter distributed to user devices and applied to an existing image on such user devices. As mentioned above, in some respects, this technique defines the image as a generic blob of data representing either all or part of the final image. For example, this technique may be applied to each layer or chunk of a container image. This technique relatively significantly reduces the storage requirements on an image storage service that would otherwise be incurred using the conventional techniques described above, and furthermore reduces a size of an update being distributed to users resulting in a relatively faster time to update the image and start a desired workload. Furthermore, techniques described herein use a binary delta updating technique to blobs to further reduce the transmission time for image updates. The blobs, e.g., layers in some approaches, need not be part of the same container and tag pair, but be across containers and tags broadening applicability. Advantageously, this technique can be applied to a system regardless of the underlying deduplication technique used by the image registry to provide additional benefits.

In these techniques, an image storage service inspects a table of the above mentioned patch references in response to a determination that a client device requests a new or updated image. The client device is sent the patch to be applied with an existing image on the remote client device. The size of the patch is considerably smaller than that of the full image resulting in a relatively faster time to instantiate the image on the remote client device and a reduction on network load. This yields relatively faster performance for the client device and reduced system demand for the cloud provider.

When using containers in a data center (e.g., managed by OpenShift) it is common for a client device to request the latest version of the container before running. Images are often updated for a variety of reasons including the application of security patches which generate a whole new image even though only a small part of the image was modified. The frequency of these updates along with often relatively large container sizes results in relatively frequent updating of images across the data center. These updates often become a primary bottleneck for starting services quickly in the cloud. By using the patching techniques described herein the size is considerably reduced yielding improved performance for this common workload. It should be noted that, in some approaches, these techniques are not limited to updating the same container and tag combination, but also may be applied across tags and container images. A container with two different tags may differ in only their configuration so a binary delta is taken between the two tags. If a system requests tag "A" and has tag "B" then this service can send them the binary delta between tag "A" and "B" for each layer of the container. Additionally, two different container images may only slightly differ due to installed packages. In some approaches in which a system requests container image "X" and has container image "Y" then this service could send the binary delta between container image "X" and container image "Y" for each layer of the container. Additionally, in response to a determination that the image service stores the image in a decomposed format, e.g., chunk-level de-duplicated, this technique can be applied on top of that format further optimizing the blob components of the image. As such, the benefits offered by the techniques described herein sustain improvements in an underlying deduplication storage architecture.

Figure 3A:
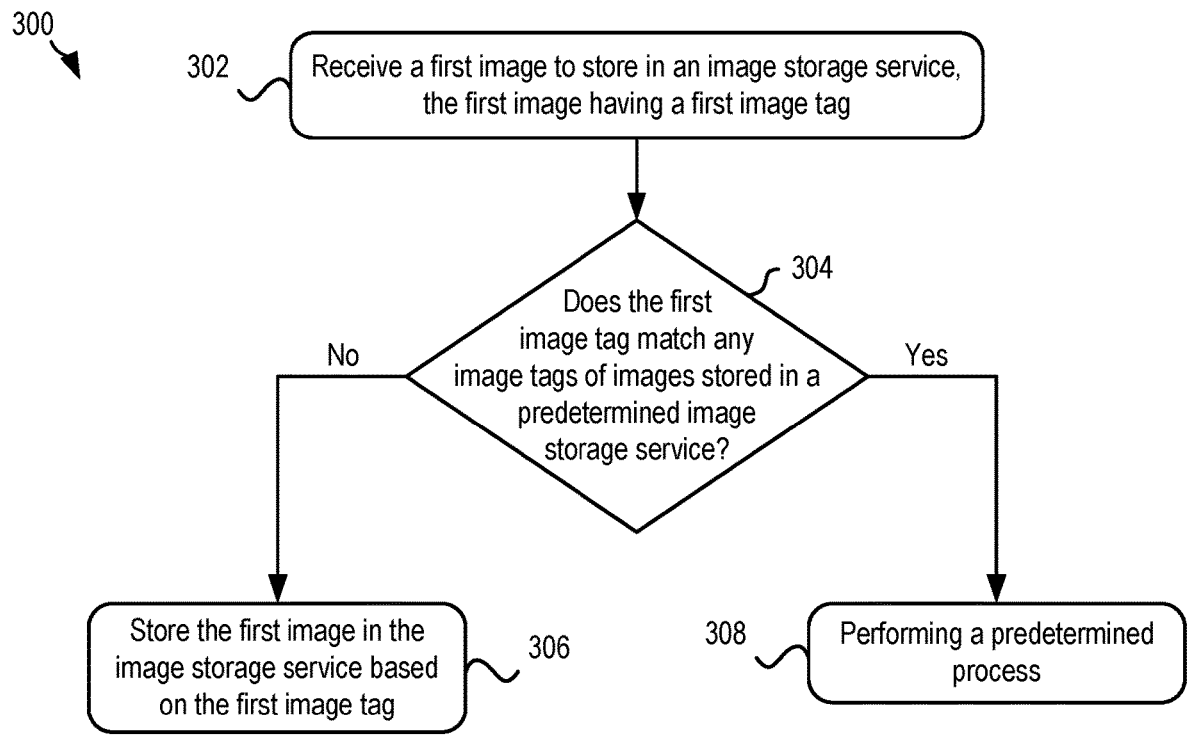
FIG. 3A is a flowchart of a method, in accordance with one embodiment of the present invention.

Now referring to FIG. 3A, a flowchart of a method 300 is shown according to one embodiment. The method 300 may be performed in accordance with the present invention in any of the environments depicted in FIGS. 1-6, among others, in various embodiments. Of course, more or fewer operations than those specifically described in FIG. 3A may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Figure 4:
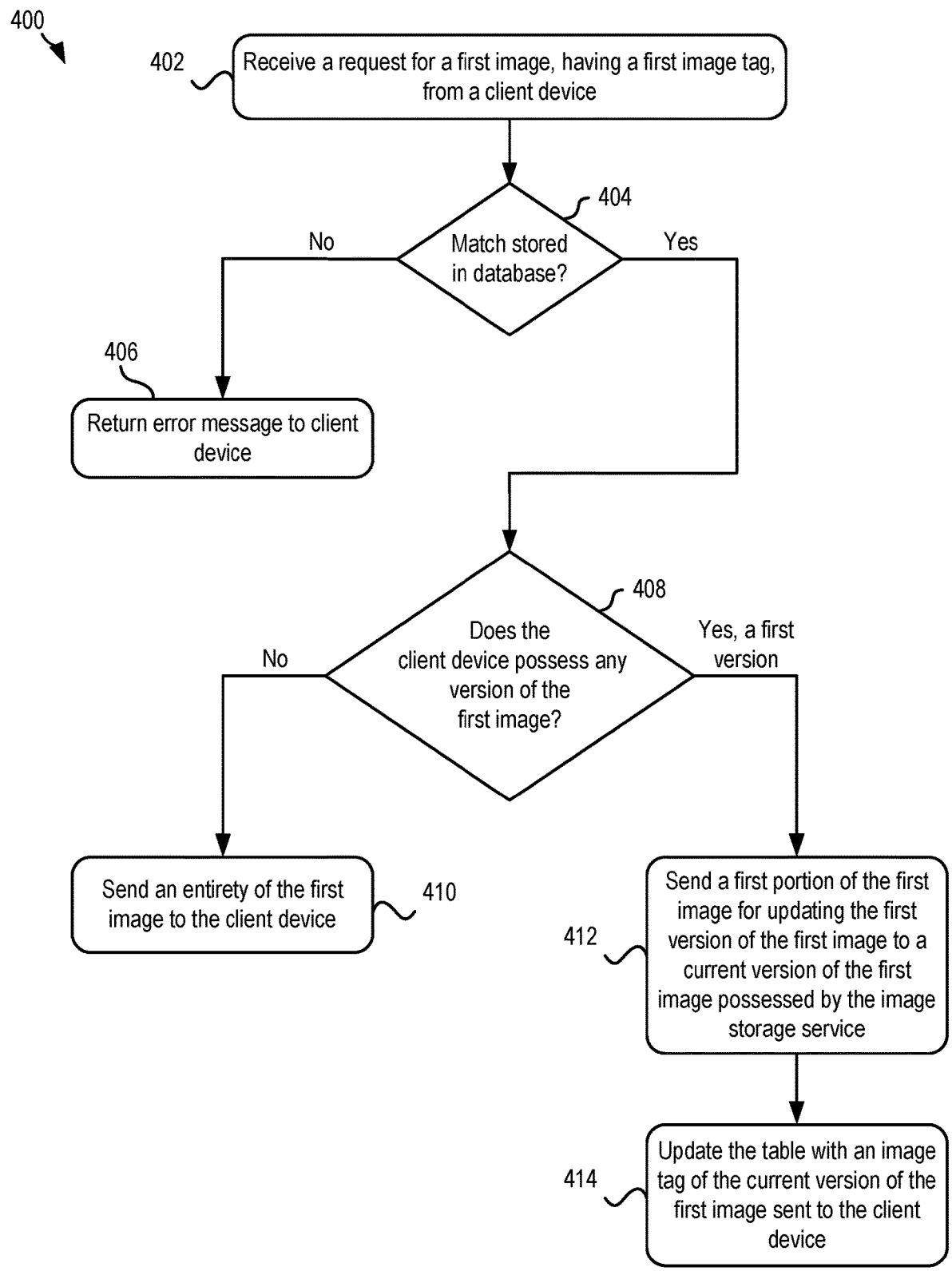
FIG. 4 is a flowchart of a method, in accordance with one embodiment of the present invention.

It may be prefaced that method 300 of FIG. 3A and method 400 of FIG. 4 include techniques for relatively efficient storage and rapid deployment of software images, e.g., "images", in a distributed system. More specifically, method 300 of FIG. 3A includes operations performed with respect to storing data to enable these efficiencies, while method 400 of FIG. 4 includes operations performed with respect to fulfilling data requests for such stored data, where the fulfillment operations also enable such efficiencies. In some approaches, the images are container images. For context, software containers may be packaged into one or more filesystem layer changesets that typically comply with an open containers initiative (OCI) image format specification. Each layer may represent a filesystem difference from the layer that precedes it. Once all unpacked, the union of these layers make the final visible file system to the running application. It is common for a container to have more than one layer often keeping common software (such as the OS distribution) in a lower layer and more application specific changes in an upper layer. The layers may have a hash associated with them, and two containers that need the same layer can share that image on disk, thereby reducing disk storage requirements.

It may also be prefaced that method 300 may be performed in a data storage system that includes an image storage service. The image storage service may be an interface that receives requests from user devices, e.g., requests to store images and/or access images, and in response thereto interacts with logical and/or physical storage resources associated with the image storage service. In some approaches, a computer, or some other processing device, may be configured to perform predetermined image analysis operations, e.g., fragment an image, deduplicate an image, etc. The data storage system is, in some preferred approaches, configured to communicate with an image datastore that includes at least one type of database storage device for storing at least portions of images, e.g., fragments. For example, the data storage system may be configured to output at least a portion of an image for storage on the image datastore. Accordingly, one or more operations described herein that refer to storing at least a portion of an image in the predetermined "data storage service" may describe the process of the predetermined data storage service being instructed to store the first image in one or more of data storage devices. The image storage service may additionally and/or alternatively be configured to communicate with a predetermined patch datastore that includes at least one type of database storage device for storing patches. For example, the data storage system may be configured to output and/or retrieve at least one patch from the patch datastore. Accordingly, one or more operations described herein that refer to storing a "patch" in the predetermined "data storage service" may describe the process of the predetermined data storage service being instructed to store the patch in one or more of data storage devices. For example, in some approaches, images of the image datastore and patches of the patch datastore may be stored on the same physical storage device, e.g., in different logical portions of the storage device. In some other approaches, the images of the image datastore and patches of the patch datastore may be stored on different physical storage devices, e.g., different physical storage devices at different physical locations.

It may furthermore be noted that various operations are described below with respect to a "first image" and a "second image". In some preferred approaches, the first image is a new software image, e.g., see operation 302, and the second image is an existing software image that is already stored in an image storage service.

Operation 302 includes receiving a first image to store in a predetermined image storage service, the first image having a first image tag, e.g., image identification (ID). In some preferred approaches, the image is related to software versions. The first image may, in some approaches, be a new software image (NSI) that is created and received by an image storage service (ISS), such as a container registry. According to some more specific approaches, the first image may be a software image that is received, e.g., as part of a software version update operation, as part of a new software launch, as part of a backup operation, etc. The first image may additionally and/or alternatively, in some approaches, be received as part of a disaster recovery site storage scheme, e.g., for storing a backup copy of a software version.

In response to receiving the first image, a determination is made as to whether the first image tag matches any image tags of images stored in the predetermined image storage service, e.g., see decision 304. For context, a determination is made as to whether the first image tag matches any image tags of images stored in the predetermined image storage service in order to determine whether at least some portions of the first image already exist in storage associated with and/or used by the image storage service. One or more techniques for comparing tags that would become apparent to one of ordinary skill in the art after reading the descriptions herein may be used to determine whether the tag of the first image matches any image tags of images stored in the predetermined image storage service. For example, in some preferred approaches, the first image tag and the image tags of images stored in the image storage service are each hash strings of an associated one of the images, e.g., the first image tag is a hash string of the first image. In one or more of such approaches, hash comparison operations of a type that would become apparent to one of ordinary skill in the art after reading the descriptions herein may be used to determine whether the tag of the first image matches any image tags of images stored in the predetermined image storage service.

In response to a determination that the tag of the first image does not match any image tags of images stored in the predetermined image storage service, e.g., as illustrated by the "No" logical path of decision 304, the first image is stored in the image storage service based on the first image tag, e.g., see operation 306. In some approaches, in response to the determination that the tag of the first image does not match any image tags of images stored in the predetermined image storage service, it may be determined that not even portions of the first image are already stored in the predetermined image storage service, and therefore an entirety of the first image is stored in the predetermined image storage service. For example, an entirety of the first image may be caused, e.g., instructed, to be stored on an available storage of a predetermined storage device that is associated with the image storage service.

Figure 3B:
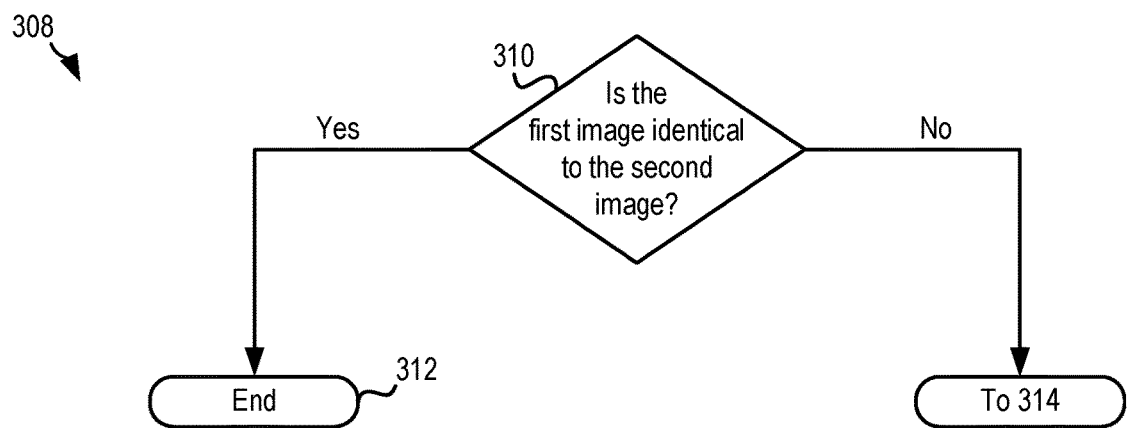
FIG. 3B is a flowchart of sub-operations of an operation of the flowchart of FIG. 3A, in accordance with one embodiment of the present invention.
Figure 3B:
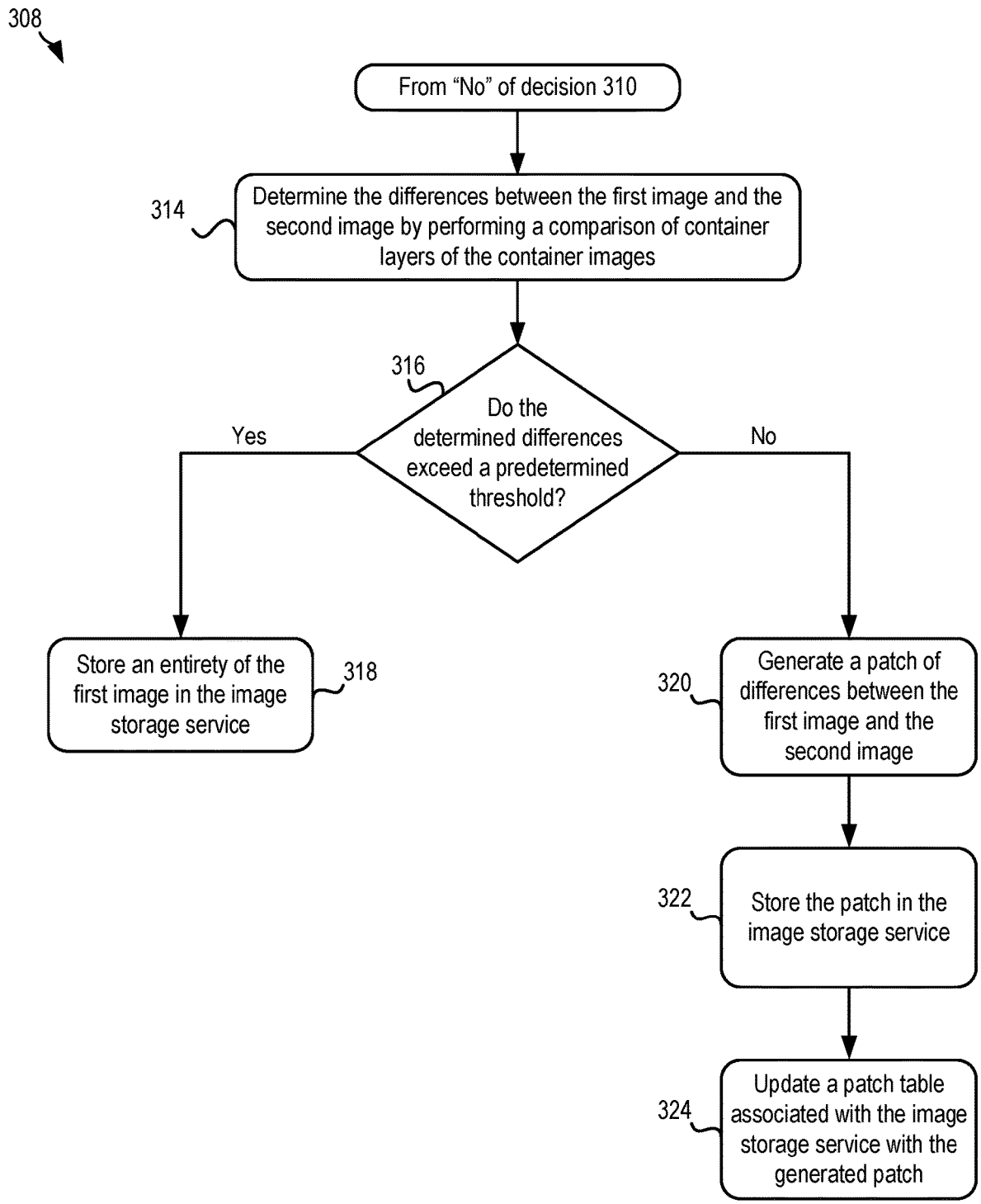

In contrast, as illustrated by the "Yes" logical path of decision 304, in response to a determination that the first image tag matches at least one other image tag of an image stored in the image storage service, e.g., such as a second image tag associated with a second image, e.g., an "existing storage image", stored in a database associated with the image storage service, a predetermined process may be performed, e.g., see operation 308. Looking to FIG. 3B, exemplary sub-processes of performing the predetermined process are illustrated in accordance with one embodiment, one or more of which may be used to perform operation 308 of FIG. 3A. However, it should be noted that the sub-processes of FIG. 3B are illustrated in accordance with one embodiment which is in no way intended to limit the invention.

Sub-operation 310 includes determining whether the first image is identical to the second image. Various comparison techniques that may be used to determine whether the first image is identical to the second image are described below. The first image may be a layered software image, in some approaches. For layered software images, e.g., such as containers, each layer may be considered to be a unique image in the determination of whether the first image is identical to the second image. Accordingly, in some approaches, a layer by layer analysis is incorporated into the comparison determination. For example, sub-operation 310 may, in some approaches, include determining the differences between the first image and the second image by performing a comparison of container layers of the container images.

With continued references to sub-operation 310, in some approaches, one or more deduplication techniques, e.g., chunk-level deduplication techniques, may be used to further decompose the image into binary blobs of a predetermined size. Thereafter, each of such blobs to be considered a unique image and a comparison technique that would become apparent to one of ordinary skill in the art after reading the descriptions herein may be used to compare the blobs of the first image to portions, e.g., other blob size portions, of images stored in the image storage database. To clarify, some descriptions herein use the term "new software image blob" or "image" to represent either a full new software image, layers of a software image, e.g., container layers, binary blobs, e.g., chunked container layer blobs, etc., which may depend on the approach and/or what is used, e.g., by the image storage service, to store and distribute the user referenced full new software image. In some approaches, in response to a determination that a full new software image is received, e.g., submitted to the image storage service, a binary difference between one or more predetermined metric pairs may be computed. Note that in some preferred approaches, a subset may be chosen, such as only pairs of the same architecture and endianness. In one illustrative approach, the determination of sub-operation 310 may include computing a binary difference between a new software image, e.g., the first image, and a prior matching software image with the same tag, e.g., the second image. For example, a binary difference between the new software image "centos: latest" may be computed with a previous software image "centos: latest". In another example, a binary difference between the new software image and a set of (possibly all) known existing tags of this software image, e.g., "centos: 7.6" vs "centos: 7.7" may be computed. In yet another example, a binary difference between the new software image and a set of (possibly all) software images, e.g., "centos: 7.6" vs "mycentos: 17.7" may be computed.

For context, and as will be described below, the determination as to whether the first image tag matches any image tags of images stored in the predetermined image storage database is made in order to determine how to efficiently store the first image tag in the predetermined image storage database such that only unique portions of the first image are stored in the predetermined image storage database while redundant portions of the first image (redundant with respect to what is already stored in the predetermined image storage database) are incorporated into a patch.

In response to a determination that the first image is identical to the second image, e.g., as illustrated by the "Yes" logical path of sub-operation 310, the method 300 optionally ends, e.g., see sub-operation 312. For context, in response to such a determination, it may be determined that an entirety of the first image having the first tag is already stored in the image storage service. Accordingly, in some approaches, it may be determined that there is no need to store a redundant copy of the first image in the image storage service, and therefore the method 300 optionally ends. In some other approaches, despite the determination that an entirety of the first image having the first tag is already stored in the image storage service, the first image may be caused to be stored again for disaster recovery purposes. For example, the image storage service may be caused to store the first image to a storage device that is determined to not already have a copy of the first image stored thereon.

In response to a determination that the first image is not identical to the second image, e.g., as illustrated by the "No" logical path of sub-operation 310, one or more predetermined actions may be executed. For example, in some approaches, an optional one of such actions may include further determining the differences between the first image and the second image, e.g., see sub-operation 314. In one of such approaches, the differences may be determined by performing a comparison of container layers of the container images. For context, it should be noted that, at least some, but not all, of the differences between the first image and the second image may already be determined upon determining that the first image is not identical to the second image. Accordingly, optional sub-operation 314 includes determining all the differences between contents, e.g., the layers, of the first image and the second image. For example, a remaining layer of the first image that has not already been compared with at least one other layer of the second image may, in some approaches, be compared with at least one layer of the second image for determining the differences between the first image and the second image. It should be noted that, the differences between two software images are, in some approaches, not limited to images that are being stored to replace an older image, but also across tagged versions of the image and across other images on a server.

The differences between the first image and the second image may be determined in order to generate a patch of differences between the first image and the second image to thereafter use for fulfilling requests for data, e.g., requests for the first image. By using a patch to note the differences between the first image and the second image, portions of the first image that match with portions of the second image are not redundantly stored in the image storage service. In contrast, to further reduce the amount of storage consumed and processing operations performed to store the first image in the image storage service, in some approaches, only unique portions of the first image that are not already stored in the image storage service, e.g., portions of the first image that are determined to not match portions of the second image, are caused to be incorporated into the patch as a result of the patch being generated.

In some approaches, the determined differences between the first image and the second image are automatically incorporated into the patch. In some other approaches, the determined differences between the first image and the second image are conditionally incorporated into the patch. For example, in one or more of such approaches, a predetermined threshold may be used to determine whether to incorporate the determined differences into the patch. For context, the determined differences may, in some approaches, total a proportion of the contents of the first image that otherwise generating a patch for does not result in preserving processing resources. In other words, in some approaches, it may be determined that differences between the first image and the second image are of such an extent that, from a processing perspective, storing an entirety of the first image in the image storage service is relatively more efficient than otherwise generating a patch that details the relatively extensive differences between the first image and the second image.

In some approaches, a predetermined threshold may be used to determine whether to store layers of the first image to the image storage service or to generate the patch. For example, sub-operation 316 includes comparing the determined differences between the first image and the second image against a predetermined threshold to determine whether to generate the patch of differences between the first image and the second image. The predetermined threshold may be set to an initial value, e.g., by a user device used by an administrator, and thereafter adjusted in order to refine and test performance associated with storing of the patches and/or images in the image storage service. In other words, the predetermined threshold may be adjusted a predetermined amount a predetermined number of times to determine whether a different predetermined threshold preserves relatively more processing potential in a system that is used to perform the storing operations. Subsequent to these adjustments and testing, a relatively most efficient predetermined threshold may be determined and used.

The predetermined threshold may, in some approaches, be a numerical value. In one or more of such approaches, the determined differences between the first image and the second image may be characterized as a numerical value, e.g., a relative proportion of differences between the first image and the second image out of all layers considered in the determination of the differences. The numerical value characterizing the differences between the first image and the second image may then be compared to the predetermined threshold. In some other approaches, the predetermined threshold may be a numerical value and a number of layers determined to include differences between the first image and the second image may be compared to the predetermined threshold for determining whether to store layers of the first image to the image storage service or to generate the patch.

In response to a determination that the determined differences between the first image and the second image are greater than the predetermined threshold (the predetermined threshold is exceeded), e.g., as illustrated by the "Yes" logical path of sub-operation 316, the patch is not generated and instead the first image is stored in the image storage service, e.g., see sub-operation 318. In preferred approaches, the entirety of the first image is stored in the image storage service. In contrast, based on results of comparing the first image and the second image, in response to a determination that the determined differences between the first image and the second image are equal to or less than the predetermined threshold (the predetermined threshold is not exceeded), e.g., as illustrated by the "No" logical path of sub-operation 316, a patch of differences between the first image and the second image is generated, e.g., see sub-operation 320.

For generality, the difference between the first image and the second image may be considered. In some approaches, the second image represents any of the variants from above, e.g., see the "known existing tags of this software image" described above. A new software image-patch database of the computed patches between the first image and the second image pairs may be maintained recognizing that, in some approaches, a patch may optionally not be stored for all of the pairs, e.g., which may be optionally controlled by the image storage service. Where a patch is present only, the first image or the second image is stored in the image storage service because the first image can be computed from the second image and the patch, and vice versa. If the first image is a replacement update to the second image, the first image patch may proactively be distributed to each machine, e.g., user device, that has a cached copy of the replaced second image, e.g., the image storage service may be instructed to proactively distribute the first image patch and/or output a notification that a patch table associated with the image storage service has been updated.

With respect to the patch that is generated, a binary difference between the first image and the second image is computed resulting in a patch file that is smaller in size than either image. As mentioned elsewhere above, a size of the patch is preferably determined by the significance of the differences between the two images. For example, a predetermined threshold may be established to determine whether it is more efficient to distribute the first image directly versus the patch if, for example, the size of the patch is almost the size of the first image. A software hash string may, in some approaches, be generated from the first image for verification purposes.

The patch may be generated in a variety of ways, depending on the approach. For example, in one approach, generating the patch includes unpacking the file systems of the first image and the second image and then saving the files that differ and associated metadata to a patch file. Tools such as "container-diff", "docker-diff", etc., may be used with container images to list differences in files and directories. This listing may be used to create the patch file. In another approach, generating the patch may include performing a byte-by-byte difference of the images, and generating a binary patch that can be applied with the same tool. Companion tools that apply the generated patch, e.g., such as "bspatch", or "git apply—binary" may be used to update the second image to match the first image, in some approaches.

The generated patch is stored in the image storage service, e.g., see sub-operation 322. Note that the generated patch may be stored on non-volatile memory and/or volatile memory associated with and used by the image storage service for physically storing the patch and/or images. A patch table associated with the image storage service may additionally and/or alternatively be updated, e.g., see sub-operation 324. In some approaches, patch table associated with the image storage service is updated to indicate that, in order to fulfill a request for the first image thereafter, at least some information of the patch in the patch table is referenced and used to establish the first image.

Method 300 may optionally include sending client device(s) possessing an image associated with the first image tag a notice that the first image has been updated.

Subsequent to at least some of the storage operations described above being performed, in response to a target machine, e.g., a user machine, requesting a new software image, e.g., from the image storage service, predetermined information may be requested from and/or received from the target machine in order to relatively efficiently (e.g., minimal processing) fulfill the software image request. For example, the predetermined information may include, e.g., a list of the existing software images stored on the machine, the specific requested image, a list of supported patch unpacking technologies, etc. In some approaches, the image storage service is caused, e.g., instructed, to lookup the requested image. In some approaches, the new software image-patch database of images may be referenced in order to determine how to relatively efficiently fulfill the request. In some approaches, the list of existing software images that are already loaded and/or cached on the target machine may additionally be considered, e.g., to determine at least some layers of the requested image that do not have to be pulled from an image datastore and/or a patch datastore to fulfill the requested image.

In one illustrative approach, the requested image mentioned above is searched for by first searching for all new software images matching the requested image in the new software image-patch database. In response to a determination that no such new software image is found, an error may be returned to the target machine. From a subset of results determined from the search, in some approaches, only tuples determined to have a match between an encoded existing software image and an image of the list of existing software images received from the target machine are retained. In contrast, in response to a determination that no matching existing software image is found, the new software image is sent in its entirety to the requesting target machine.

Assuming that a subset of results is determined from the search, in some approaches, from this subset of results only those tuples where a patch packing technique matches one of the supported unpacking techniques from the remote machine may be used. Note that, in some approaches, in response to a determination that no matching existing software image is found, then the new software image is sent in its entirety.

At this point, the set of tuples of the form {new software image, existing software image, patch, metadata} remain, where the new software image matches the requested image, and the existing software image matches one of the existing software images from the target machine. In response to a determination that only one tuple is found, the patch is sent to the target machine provided that a size of the patch is determined to be under a predetermined size threshold. For example, in some approaches, a heuristic may be used to determine whether the patch technique should be used, or the new software image should be sent in its entirety. An example of such a heuristic includes a predetermined threshold based on the total size of the patch and hash string are above, e.g., for example 80% of, the size of the new software image then the new software image is sent directly without using this technique. A payload sent to the target device may, in some approaches, include, e.g., the binary patch, the patch encoding technique, a hash of the new software image stored on the image storage service, and a reference to the existing software image on the target machine. However, in response to a determination that the size of the patch exceeds the predetermined size threshold, the new software image is sent in its entirety to the target device. In some approaches, more than one tuple may be found during the search. In one or more of such approaches, the tuple with the smallest patch size is preferably sent to the target machine. Note that the predetermined size threshold may optionally be applied in this approach as well.

Note that use of a patch for fulfillment of a request for an image will be described in greater detail below, e.g., see FIG. 4.

Now referring to FIG. 4, a flowchart of a method 400 is shown according to one embodiment. The method 400 may be performed in accordance with the present invention in any of the environments depicted in FIGS. 1-6, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Operation 402 includes receiving a request for a first image, having a first image tag, from a client device, e.g., a requesting target machine. In some approaches, at least a portion, e.g., a layer, of the first image may be stored in the image storage service. Accordingly, a determination is made as to whether an image having a tag that matches the first image tag is stored in a database associated with the image storage service, e.g., see decision 404. In some approaches, the first image tag and tags associated with images stored in the image storage service may be hash strings of the associated images, e.g., the first image tag is a hash string of the first image. Accordingly, in some of such approaches, determining whether an image having a tag that matches the first image tag is stored in the database includes comparing hash strings using comparison techniques that would become apparent to one of ordinary skill in the art after reading the descriptions herein.

In response to a determination that a match does not exist in the database, e.g., as illustrated by the "No" logical path of decision 404, an error message may be returned to the client device, e.g., see operation 406. In some approaches, the error message may indicate that the requested image was not found stored in the image storage service.

In contrast, a determination may be made that a match does exist in the database, e.g., see the "Yes" logical path of decision 404. For example, in some approaches the first image tag and an image tag of a current version of the first image stored in the image storage service may be hash strings of the images (respectively). In such an approach, the first image tag and the tag of the current version of the first image stored in the image storage service may match. Note that in some approaches, the first image is the requested image having a first tag that is being compared with a second tag of the current version of the first image.

In response to a determination that the first image exists stored in the image storage service, the first image stored in the image storage service may be used to fulfill the request for the first image. However, in order to reduce an amount of processing that would otherwise be consumed in fulfilling such a request for an image, a determination may be made as to whether the requesting client device already has any of the first image, e.g., cached on a storage device associated with the client device, stored locally on the client device, etc. This consideration reduces an amount of processing that is otherwise performed in fulfilling the request for the first image because an amount of data that is output to the client device is reduced, when possible, e.g., portions of a requested image are not redundantly output to the client device. For example, decision 408 includes determining whether the client device possesses any version of the first image. In some approaches, information used to determine whether the client device possesses any version of the first image is requested from the client device, e.g., in response to receiving the request for the first image. In some other approaches, information used to determine whether the client device possesses any version of the first image is received from the client device with the request for the first image. In some other approaches, a table associated with the image storage service may be referenced to determine whether the client device possesses any version of the first image. Such a table may, in some approaches, include, e.g., timestamp information, a ledger, an output history list, etc., that indicates what images and/or patches and/or image tags have previously been output to at least the client device. In some approaches, the table may additionally and/or alternatively include information that was obtained from the client device during a previous request made to the image storage service.

It may be noted that, in some approaches, multiple patching options may exist for the request. For example, in one of such approaches, the requesting client device may have a first version and a second version, e.g., version 1 and version 2, of an image, and it may be determined that the client device is requesting a third version of the image, e.g., version 3. In such an approach, there may be two patch options, e.g., first from version 1 to version 3, and second from version 2 to version 3. In some preferred approaches, in response to a determination that a plurality of patch options are available, one of the patch options may be selected. For example, from the set of patch options in the present example, the patches may be ordered by a size of the patches in each option. In one preferred approach, the relatively smallest patch size is preferably determined and used for fulfilling the request from the client device in order to reduce processing overhead.

In response to a determination that the client device does not possess any version of the first image, e.g., as illustrated by the "No" logical path of decision 408, an entirety of the first image is sent to the client device, e.g., see operation 410. In contrast, a determination may be made that the client device includes a first version of the first image, e.g., as illustrated by the "Yes, a first version" logical path of decision 408. For example, in one approach, a determination may be made, based on information in the table associated with an image storage service, that a first portion of the first image, e.g., a first version of the first image, is currently possessed by the client device. In response to a determination that the client device possesses a first version of the first image, a first portion of the first image for updating the first version of the first image to a current version of the first image possessed by the image storage service may be determined and sent to the client device, e.g., see operation 412.

In some approaches, the first portion of the first image that is sent to the client device is a patch of determined differences between the first version of the first image and the current version of the first image. The patch may have been previously stored in the image storage service to reflect the differences between the first version of the first image and the current version of the first image, e.g., in response to receiving a request to store the current version of the first image in the image storage service where the first version of the first image is already stored in the image storage service. Information in the patch may, in some approaches, be used by the client device to determine what the current state of the first image is, e.g., thereby fulfilling the request for the first image.

An optional operation of method 400 includes updating the table with an image tag of the current version of the first image sent to the client device. See operation 414. By updating the table, the version of images on the client device may remain known and thereby reduce an amount of processing that would otherwise be consumed in requesting such information from the client device upon a next request for an image being received from the client device.

In some illustrative approaches, the client device is referred to as a "target machine." The target machine may be, e.g., a computer, a processing circuit, etc. The target machine receives either the full new software image, e.g., referred to above as the "current version of the first image", or a payload consisting of, e.g., the binary patch, an encoding mechanism for the patch, a hash string of the new software image, reference to the local existing software image to which the patch applies (referred to above as the "current version of the first image"), etc. In some approaches, the image storage service sends one or more of these contents to the target device. In response to a full new software image being received, the full new software image may be applied by the target device using techniques that would become apparent to one of ordinary skill in the art after reading the descriptions herein. In contrast, assuming that a patch is sent to the target device, the binary patch may be applied to the local existing software image to create a candidate image (CI). A hash string may be created for the CI, and the hash string from the CI may be compared to the hash string provided with the patch (representing the hash of the new software image on the image storage service). The hash string is distributed with the software patch and may be caused, e.g., instructed, to be used to verify that the patched image on the remote machine is exactly the same as the new image. For example, in response to a determination that the hashes are equal, the local CI and the new software image in the image storage service may be determined to be equal. Furthermore, the CI is recognized as the new software image on the target machine. In response to a determination that the hashes differ, it may be determined that a problem occurred, e.g., such as data corruption when transferring or storing the patch. In response to the determination that a problem occurred, an attempt to retry the transfer of the patch to the target device may be initiated, in one approach. In another approach, in response to the determination that a problem occurred, the full new software image may be transferred to the target device.

The patch is preferably applied using the corresponding technique used to encode it. For example, assuming that the patch was generated by "bsdiff", the target system preferably uses "bspatch" to apply the patch when generating the CI. Alternatively, assuming that the patch was generated by unpacking the file systems, the target system may use a predetermined technique to apply the patch. For example, the predetermined technique may include unpacking the patch file, and unpacking the corresponding existing software image. The new files may then be injected from the unpacked patch to the unpacked existing software image, creating an unpacked CI. Furthermore, in some approaches, metadata updates encoded in the patch are applied to the unpacked CI, and the CI is repacked, and the hash is computed. It should be noted that, because the software patch is relatively much smaller than the new software image, this technique reduces the time to transfer the new image to the requesting device, e.g., the client device, the target device, or any other device to which the image is to be distributed. This relatively streamlines the time consumed in updating remote machines, and the time to apply updates to running services in environments such as the cloud. Accordingly, the techniques described herein enable relatively efficient storage and rapid deployment of software images in a distributed system.

Figure 5A:
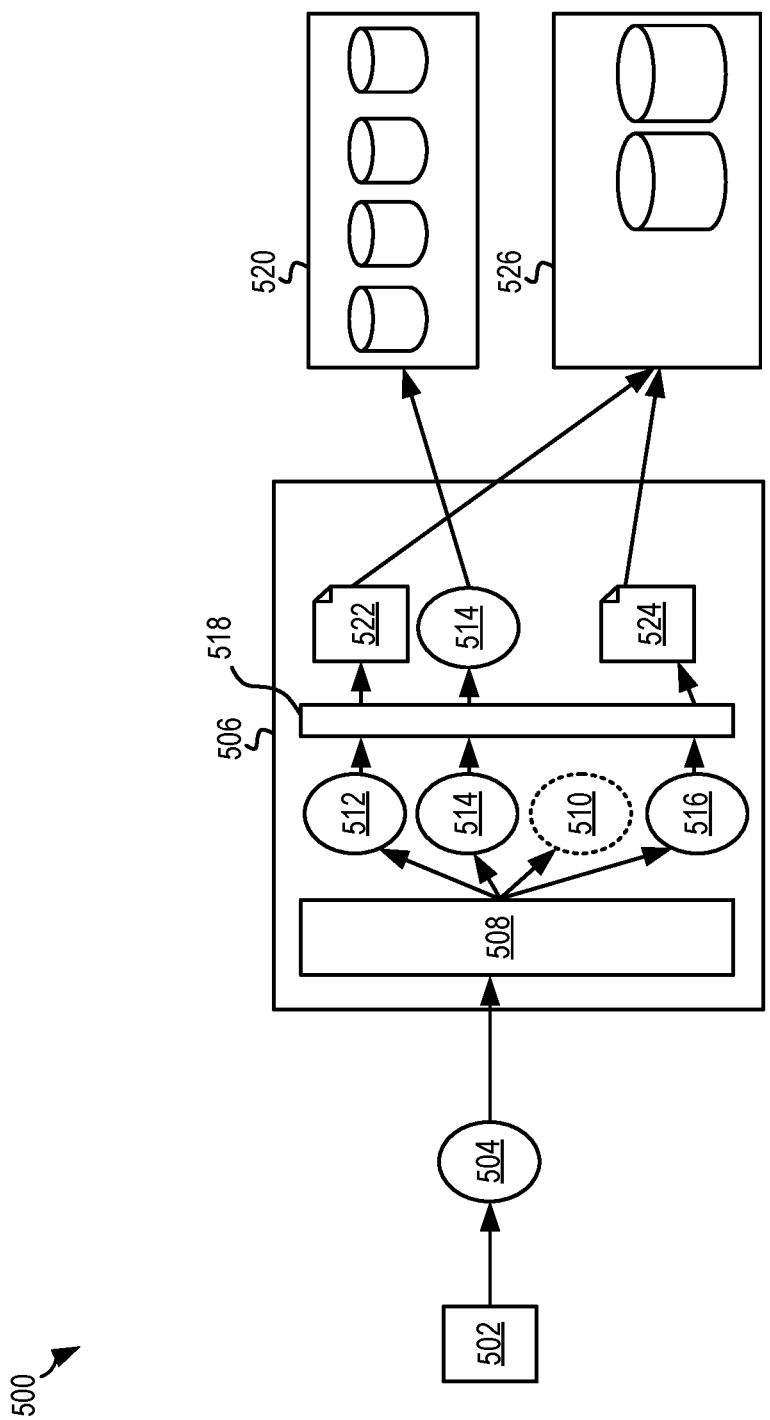
FIG. 5A is a representation of a data storage environment, in accordance with one embodiment of the present invention.
Figure 5B:
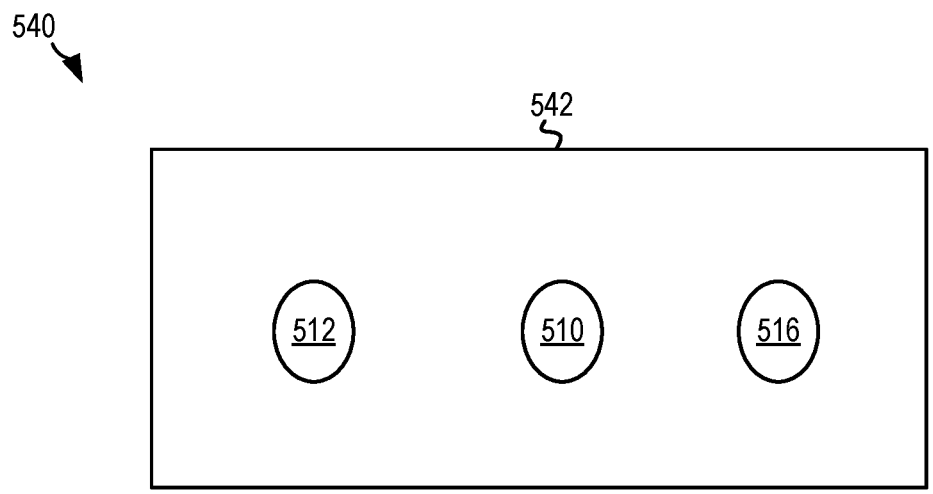
FIG. 5B is a representation of data of the data storage environment in FIG. 5A, in accordance with one embodiment of the present invention.
Figure 5C:
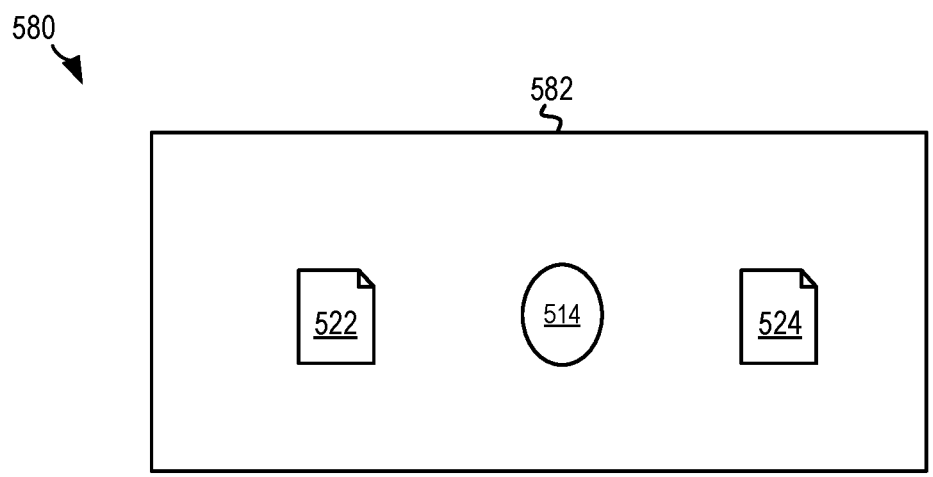
FIG. 5C is a representation of data of the data storage environment in FIG. 5A, in accordance with one embodiment of the present invention.

FIGS. 5A-5C depict representations 500, 540 and 580 of a data storage environment, in accordance with several embodiments. As an option, the present data storage environment(s) represented by 500, 540 and 580 may be implemented in conjunction with features from any other embodiment listed herein, such as those described with reference to the other FIGS. Of course, however, such data storage environment(s) represented by 500, 540 and 580 and others presented herein may be used in various applications and/or in permutations which may or may not be specifically described in the illustrative embodiments listed herein. Further, the data storage environment(s) represented by 500, 540 and 580 presented herein may be used in any desired environment.

Referring first to representation 500 FIG. 5A, the data storage environment includes a developer device 502. A full new software image 504 having a first tag is received from the developer device to store in an image storage service 506. In response to receiving the full new software image, the full new software image may be decomposed into one or more new software images. In some approaches, predetermined logic 508 of the image storage service may be caused to decompose the full new software image. For example, the new software image may be fragmented and/or deduplicated. In some approaches, a binary difference is generated between one or more of: the new software image and a prior matching software image with the same tag, the new software image and a set of known existing tags of the software image and/or the new software image and a set of other software images stored in the image storage service.

In some approaches, a redundant fragment 510 of the new software image may be identified from results of the determined differences. The redundant fragment is preferably not saved. Unique image fragments, e.g., see fragments 512, 514 and 516 may additionally and/or alternatively be identified from the results of the determined differences. In order to preserve processing potential, a patch may be generated in order to record these unique fragments in the image storage service. Note that, in some approaches, the patch is only generated in response to a determination that a predetermined threshold is not exceeded, where an entirety of the full new software image is otherwise stored in response to a determination that the predetermined threshold is exceeded.

In operation 518, the patch may be generated. For example, in response to a determination that unique fragment 514 causes the predetermined threshold to be exceeded, the unique fragment 514 is saved to an image datastore 520 having a plurality of storage modules associated therewith. In contrast, a determination is made that the unique fragments 512 and 516 do not cause the predetermined threshold to be exceeded. Accordingly, patches 522 and 524 are created for the unique fragments 512 and 516 (respectively) and stored to a patch datastore 526 having a plurality of storage modules associated therewith. In some preferred approaches, the patch datastore 526 includes a new software image database, e.g., a table that includes all the patches.

In some approaches, the image storage service stores a reference to the full new software image, existing software images (the new software image and a prior matching software image with the same tag, the new software image and a set of known existing tags of the software image and/or the new software image and a set of other software images stored in the image storage service), and the resulting patch in the new software image-patch database for reference on request.

Referring now to FIGS. 5B-5C, representations 540 and 580 illustrate the relatively significant amounts of processing potential and storage space that is preserved by implementing the techniques described herein in a data storage environment. For example, representation 540 includes a collection 542 of full fragments of the new software image that would otherwise be stored without using the techniques described herein. As illustrated in collection 582 of representation 580, as opposed to saving the full fragments shown in representation 540, here only one full fragment 514 and two patches 522 and 524 are stored. It should be noted that patches are smaller than full fragments, and therefore storage space and processing resources that would otherwise be expended to store the full fragments in collection 542 are preserved. In other words, these representations show that, in some approaches, as a result of the patch(es) being created, either the new software image or the existing software image from which it is compared are preserved by the image storage service, but not both. The patch plus either of the images can be used to generate the other image thereafter saving storage space on the image storage service.

Figure 6:
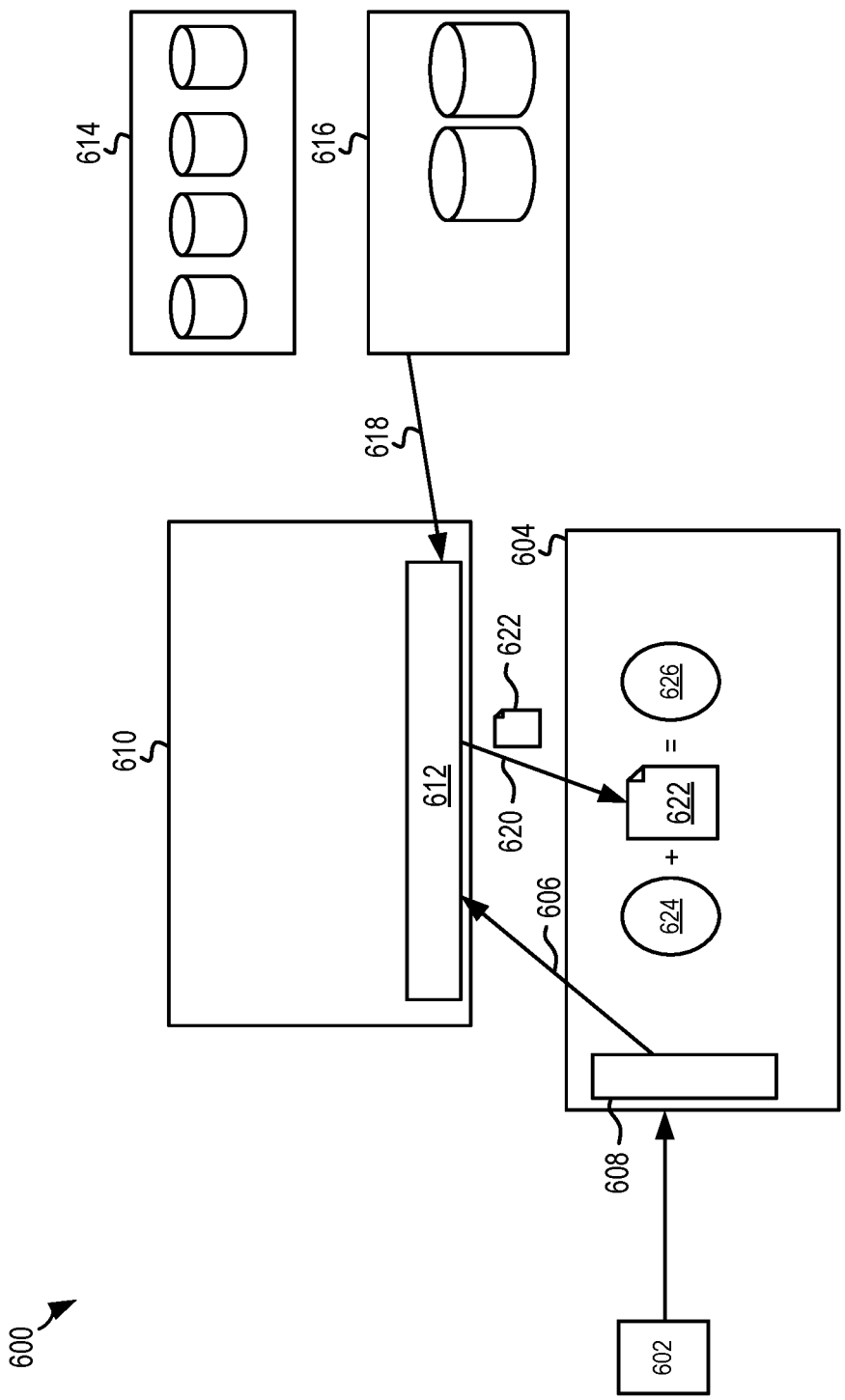
FIG. 6 is a representation of a data storage environment, in accordance with one embodiment of the present invention.

FIG. 6 depicts a representation 600 of a data storage environment, in accordance with one embodiment. As an option, the present representation 600 may be implemented in conjunction with features from any other embodiment listed herein, such as those described with reference to the other FIGS. Of course, however, such representation 600 and others presented herein may be used in various applications and/or in permutations which may or may not be specifically described in the illustrative embodiments listed herein. Further, the representation 600 presented herein may be used in any desired environment.

A request for a first image, having a first image tag, may be received from a target device 604 used by a user 602, e.g., see operation 606. In some approaches, the request includes predetermined information 608. The predetermined information 608 may include, e.g., a specification that the first image is requested, a list of existing software image references stored on the target machine, a list of patch unpacking technologies supported locally on the target machine, etc.

In some approaches, the request is received from the target device by an image storage service 610. Predetermined logic 612 may be caused to be executed to determine what to send to the target device. For example, in some approaches, either the full new software image or a tuple of the form, e.g., patch, patch encoding technique, new software image hash, and local existing software image reference, may be returned to the target device. For example, in response to a determination that the full new software image is to be provided, e.g., no patch exists, then the new software image is provided to the target device in its entirety. For example, the new software image may be retrieved by querying a new software image-patch database of image datastore 614. In response to a determination that a patch is to be provided to the target device, the patch is caused, instructed, to be applied to the local existing software image using the patch decoding technique generating a "candidate image", e.g., an existing software image with an associated patch applied. For example, the patch may be retrieved from the patch datastore 616 in operation 618. The patch is applied to a software image 624 local on the target device to generate candidate image 626. In some approaches, a hash of the candidate image is computed and compared to the new software image hash in the payload, e.g., see payload 620 that includes patch 622. Furthermore, in response to a determination that the two hashes match, the candidate image is accepted as the new software image. In contrast, in response to a determination that the two hashes differ, the candidate image is rejected as the new software image. The target device may then request that the patch be resent, or the new software image may be sent in its entirety.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a first image, having a first image tag, to store in a predetermined image storage service, wherein the first image tag is an image identification (ID) of the first image;
determining whether the first image tag matches any image tags of images stored in the image storage service; and
in response to a determination that the first image tag matches a second image tag that is an image ID of a second image stored in the image storage service, performing a predetermined process including:
determining whether the first image is identical to the second image; and
in response to a determination that the first image is not identical to the second image, executing actions comprising:
generating a patch of differences between the first image and the second image to thereafter use for fulfilling requests for data,
wherein the patch of differences between the first image and the second image is stored in a first datastore on a first physical device,
wherein the first image is stored in a second datastore on a second physical device.

2. The computer-implemented method of claim 1, comprising: in response to a determination that the first image tag does not match any of the image tags of the images stored in the image storage service, storing the first image in the image storage service based on the first image tag.

3. The computer-implemented method of claim 1, wherein the first image and the second image are container images.

4. The computer-implemented method of claim 3, comprising: determining the differences between the first image and the second image by performing a comparison of container layers of the container images; and incorporating the determined differences into the patch.

5. The computer-implemented method of claim 3, comprising: determining the differences between the first image and the second image by performing a comparison of container layers of the container images; and comparing the determined differences against a predetermined threshold to determine whether to generate the patch of differences between the first image and the second image.

6. The computer-implemented method of claim 5, wherein the patch of differences between the first image and the second image is generated in response to a determination, based on results of the comparison, that the predetermined threshold is not exceeded.

7. The computer-implemented method of claim 1, wherein the first image tag and the image tags of the images stored in the image storage service are each hash strings of an associated one of the images.

8. The computer-implemented method of claim 1, comprising:
sending client device(s) possessing an image associated with the first image tag, a notice that the first image has been updated.

9. A computer-implemented method, comprising:
receiving a request for a first image, having a first image tag, from a client device,
wherein the first image tag is an image identification (ID) of the first image;
determining, from a table, whether the client device possesses any version of the first image, wherein the table includes an output history list that indicates images, patches and image tags that have previously been output to the client device; and
in response to a determination that the client device possesses a first version of the first image, sending a first portion of the first image for updating the first version of the first image to a current version of the first image possessed by an image storage service.

10. The computer-implemented method of claim 9, comprising: in response to a determination that the client device does not possess any version of the first image, sending an entirety of the first image to the client device.

11. The computer-implemented method of claim 9, further comprising:
updating the table with a second image tag that is an image ID of the current version of the first image sent to the client device.

12. The computer-implemented method of claim 11, wherein the first image tag is a hash string of the first image, wherein the second image tag is a hash string of the current version of the first image.

13. The computer-implemented method of claim 9, wherein the first portion of the first image is a patch of determined differences between the first version of the first image and the current version of the first image.

14. A computer program product, the computer program product comprising a computer readable storage medium having program instructions embodied therewith, the program instructions readable and/or executable by a computer to cause the computer to:

receive a first image, having a first image tag, to store in a predetermined image storage service, wherein the first image tag is an image identification (ID) of the first image;
determine whether the first image tag matches any image tags of images stored in the image storage service; and
in response to a determination that the first image tag matches a second image tag that is an image ID of a second image stored in the image storage service, perform a predetermined process including:
determining whether the first image is identical to the second image; and
in response to a determination that the first image is not identical to the second image, executing actions comprising:
generate a patch of differences between the first image and the second image to thereafter use for fulfilling requests for data,
wherein the patch of differences between the first image and the second image is stored in a first datastore on a first physical device,
wherein the first image is stored in a second datastore on a second physical device.

15. The computer program product of claim 14, the program instructions readable and/or executable by the computer to cause the computer to: in response to a determination that the first image tag does not match any of the image tags of the images stored in the image storage service, store the first image in the image storage service based on the first image tag.

16. The computer program product of claim 14, wherein the first image and the second image are container images.

17. The computer program product of claim 16, the program instructions readable and/or executable by the computer to cause the computer to: determine the differences between the first image and the second image by performing a comparison of container layers of the container images; and incorporate the determined differences into the patch.

18. The computer program product of claim 16, the program instructions readable and/or executable by the computer to cause the computer to: determine the differences between the first image and the second image by performing a comparison of container layers of the container images; and compare the determined differences against a predetermined threshold to determine whether to generate the patch of differences between the first image and the second image.

19. The computer program product of claim 18, wherein the patch of differences between the first image and the second image is generated in response to a determination, based on results of the comparison, that the predetermined threshold is not exceeded.

20. The computer program product of claim 14, wherein the first image tag and the image tags of the images stored in the image storage service are each hash strings of an associated one of the images.

* * * * *